Nov. 11, 1947.  H. G. HUGHEY  2,430,511
MIXING ARRANGEMENT FOR TORCHES
Filed July 7, 1943  2 Sheets-Sheet 1
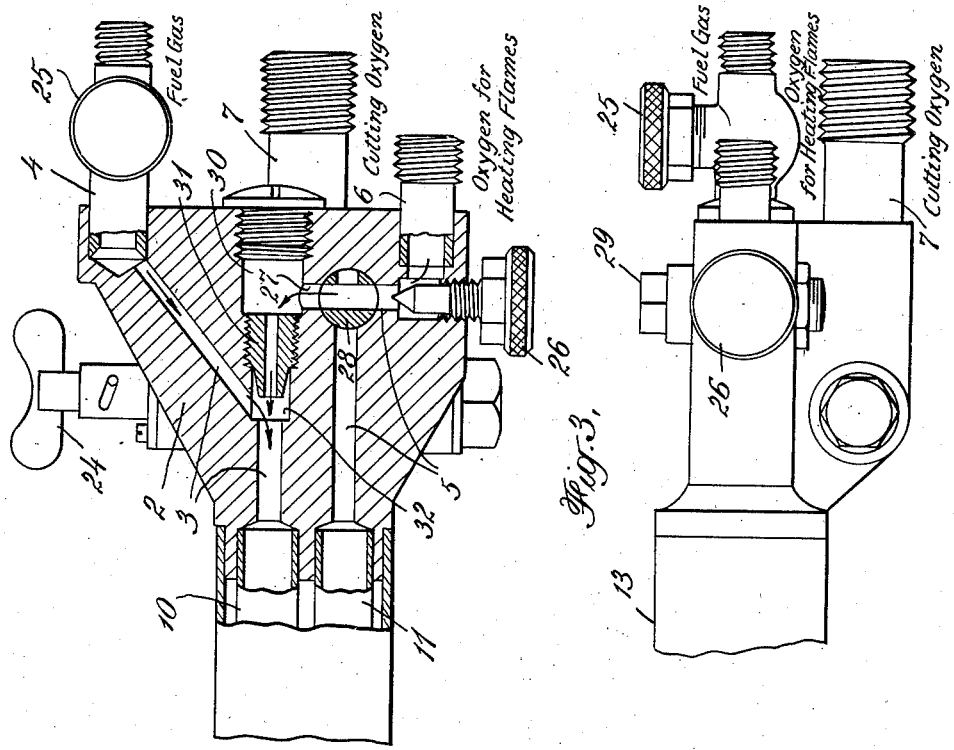
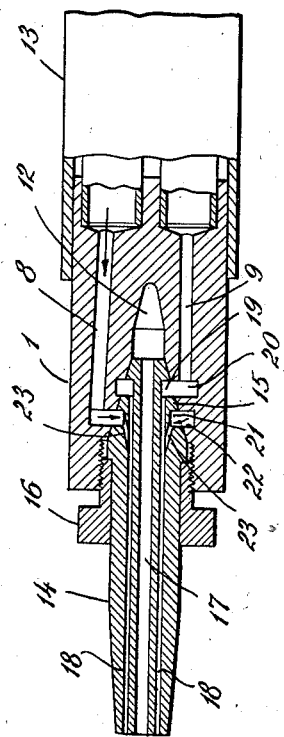
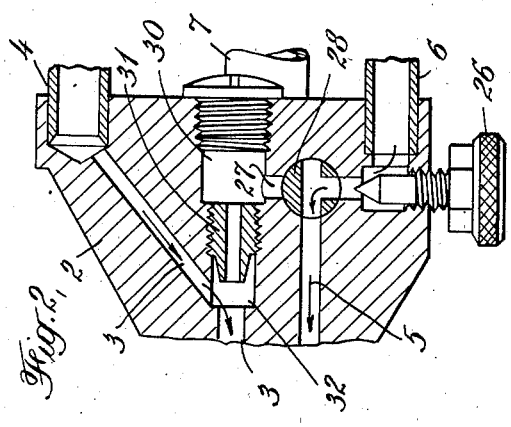
INVENTOR.
Howard G. Hughey
BY
ATTORNEYS

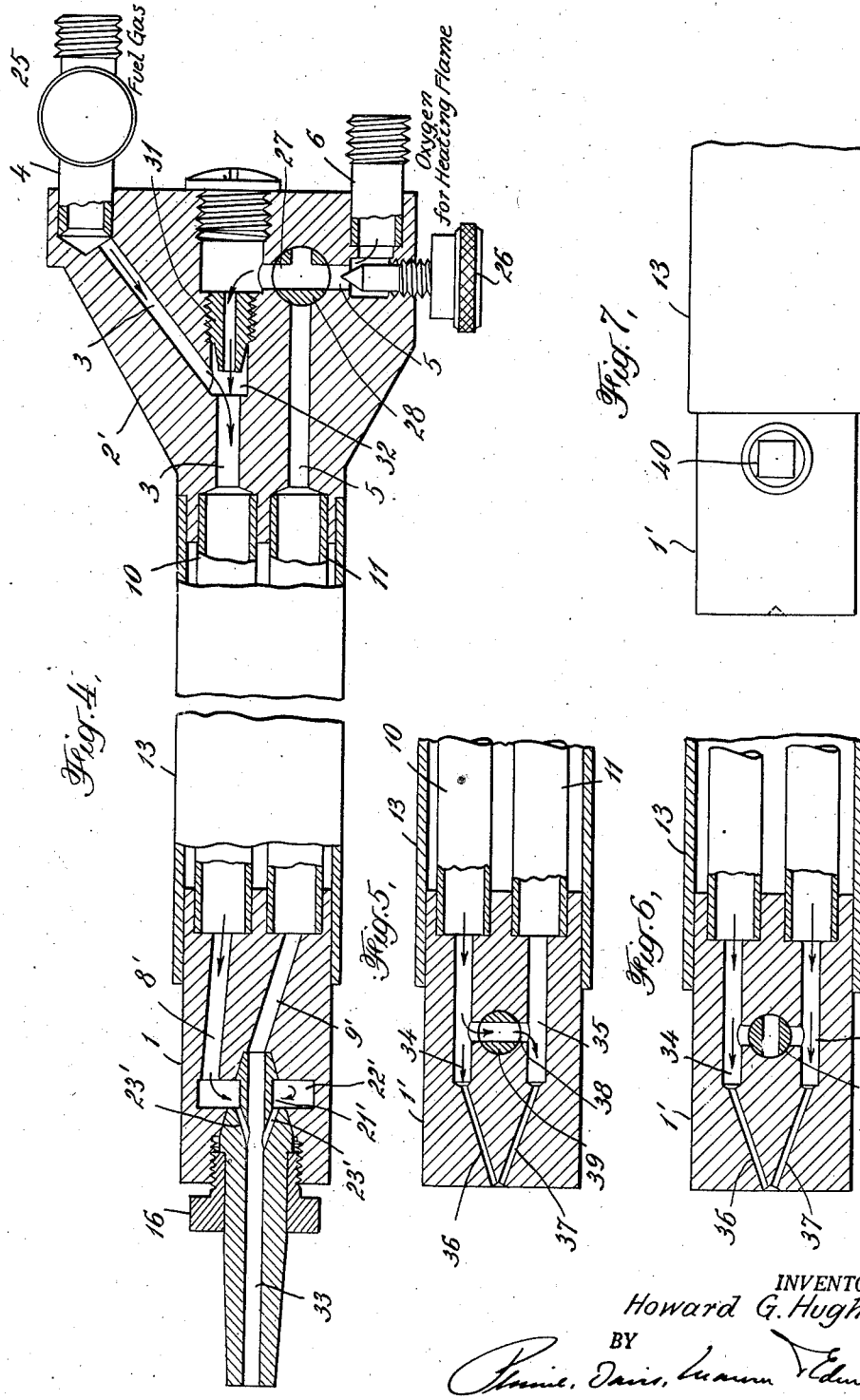

Patented Nov. 11, 1947

2,430,511

UNITED STATES PATENT OFFICE 2,430,511

MIXING ARRANGEMENT FOR TORCHES

Howard G. Hughey, Fanwood, N. J., assignor to Air Reduction Company, Incorporated Application July 7, 1943, Serial No. 493,737

2 Claims. (Cl. 158—27.4)

This invention relates to improvements in gas torches, such as oxyacetylene torches used for cutting, heating and welding.

In one well-known type of torch the mixing of the oxygen and fuel gas for the heating flame or flames is effected within the tip of the torch by passages which converge and meet so that one of them conducts one of the gases into the stream of gas flowing in the other passage. This is called "tip mixing" and is particularly suitable for mixing gases where it is desirable that the gases, after mixing, flow through passages of limited length and cross-sectional area, such as in the case of oxygen and acetylene. However, when propane and similar fuel gases are used, it is desirable that the oxygen and fuel gas, after mixing, be passed through longer passages and passages of greater cross-sectional area. In this case it is preferable to effect mixing of the gases at a point remote from the tip, for instance, at the rear end of the torch body. For convenience, this type of mixing will be referred to herein as "premixing" or "body mixing" to distinguish from mixing in or at the tip.

The principal object of this invention is to provide a torch which may be easily and quickly converted, as by turning one or more valves, from a torch operating on the tip-mixing principle to one operating on the body-mixing principle, or vice versa, thereby making the torch suitable for use either with acetylene or some other fuel gas such as propane.

According to the invention the torch is provided with selective means for effecting mixing of the gases either in or at the tip, or at a point remote from the tip, such as within the torch body and preferably at the rear end thereof. Such means preferably comprises a by-pass in the rear end of the body adapted to place the oxygen and fuel gas passages in communication, and a manually operable valve adapted in one position to close the by-pass and permit flow of oxygen and fuel gas separately to the passages in the tip for mixing thereby, and in another position to close one of the body passages and direct the gas which would otherwise flow therethrough through the by-pass into the second body passage so that mixing of the gases may, when desired, be effected at the rear end of the body and the mixture delivered by means of the second body passage to the passage in the tip with which it communicates.

In one form of the invention the converging passages in the tip are such that their axes intersect at a point outside of the tip, and a second valve-controlled by-pass between the oxygen and fuel gas passages is provided near the tip. When this by-pass is closed and the valve at the rear end of the torch is in a position to deliver oxygen and fuel gas separately through the body passages to the tip, the gases will emerge from the tip passages separately but will meet and mix at a point external to the tip. When the valve at the rear end of the torch is in a position to deliver a mixture of the gases through one of the body passages toward the tip, and when the by-pass near the tip is open, the stream of mixed gases will divide and a portion will be delivered to each of the converging passages in the tip to produce impinging flame jets.

Several forms of the invention are illustrated in the accompanying drawings, in which:

Figure 1 is a plan view of a cutting torch embodying the invention, the end portions of the torch being shown in horizontal section;

Fig. 2 is a fragmentary horizontal section of the rear end of the torch of Fig. 1 showing the manually operable valve which selects the point of mixing turned to tip-mixing position;

Fig. 3 is a side elevation of the rear end of the torch shown in Fig. 1;

Fig. 4 is a plan view of a heating or welding torch embodying the invention, the end portions of the torch being shown in horizontal section;

Fig. 5 is a horizontal section of the tip portion of a modified form of torch embodying the invention showing an arrangement of tip passages adapted to produce tip-mixing at a region just outside of the tip and showing the above-mentioned second valve-controlled by-pass near the tip.

Fig. 6 is a view corresponding to Fig. 5 but showing the by-pass valve turned to the external tip-mixing position; and Fig. 7 is a plan view of the tip portion of the torch of Figs. 5 and 6 showing its exterior and the means for operating the by-pass valve of Figs. 5 and 6.

Referring first to Figs. 1 to 3 inclusive, the cutting torch shown therein comprises a body having a head 1 at its forward end and a block 2 at its rear end. The block 2 has a passage 3 to which fuel gas may be delivered by a hose attached to the nipple 4. The block also has a passage 5 to which oxygen for the heating flames is admitted by means of a hose attached to a nipple 6. A passage for cutting oxygen is also provided in the block 2 but this passage does not show in Fig. 1 because it lies below the plane at which the section is taken. Oxygen may be admitted to this passage by means of a hose attached to a nipple 7.

The head 1 has a passage 8 corresponding to the passage 3 in the block, and a passage 9 corresponding to the passage 5 in the block. The passage 3 in the block and the passage 8 in the head are placed in communication by means of a tube 10. Similarly a tube 11 places the passage 5 in the block in communication with the passage 9 in the head. A third tube which does not show in Fig. 1 places the cutting oxygen passage of the block in communication with a corresponding passage 12 in the head. The tubes may be enclosed in a cylindrical casing 13 which constitutes a handle for the torch.

The torch shown in Fig. 1 has a detachable tip 14 of a well-known type. The tip has a conical rear end 15 which is held in a conical seat in the head by means of a tip nut 16. A central passage 17 in the tip communicates with the oxygen passage 12 in the head and delivers oxygen to the cutting jet. The central passage 17 is surrounded by a number of passages 18 which deliver a mixture of cutting oxygen and fuel gas to the heating flame jets.

An annular recess 19 at the rear end of the tip communicates with all of the passages 18 and registers with a corresponding annular recess 20 in the head to form an annular distributing chamber to which oxygen for the heating flames is supplied by the passage 9 in the head when the torch is operating on the tip-mixing principle. The rear end of the tip also has an annular recess 21 which registers with an annular recess 22 in the head and forms an annular distributing chamber to which fuel gas is supplied by the passage 8 in the head when the torch is operating on the tip-mixing principle. A series of inclined passages 23 in the rear end of the tip communicate with the annular tip recess 21 and converge toward the axis of the tip and each of these passages meets one of the tip passages 18. When the torch is operating on the tip-mixing principle fuel gas entering the tip through the passages 23 mixes with the oxygen admitted at the rear end of the passages 18 and the mixture of oxygen and fuel gas is delivered by the passages 18 to the heating flame jets.

The torch as thus far described is of standard and well-known construction. In addition to the parts already mentioned such a torch is usually equipped with valves represented at 24, 25 and 26 for controlling the supply of cutting oxygen, fuel gas, and oxygen for the heating flames.

The above-mentioned by-pass between the fuel gas and oxygen passages which is provided in accordance with the invention may be located anywhere in the body of the torch but it is preferably formed in the block 2 and is shown at 27. This by-pass and the portion of the passage 5 in advance of it are controlled by a three-way valve 28. The valve 28 may be operated in any suitable way as by means of a handle located exteriorly of the block 2, but is preferably turned by a wrench or other suitable tool applied to a squared end 29 at the outer end of the valve shaft as shown in Fig. 3. When the valve 28 is in the position shown in Fig. 1 it closes off the portion of the passage 5 beyond the valve and the incoming oxygen for the heating flames is then delivered through the by-pass 27 into a bore 30 in the block 2. It then passes through a nozzle 31 and is delivered to a mixing chamber 32. This mixing chamber constitutes in effect a portion of the fuel gas passage 3 so that the oxygen leaving the nozzle 31 mixes with the fuel gas entering the mixing chamber through this passage. The mixture of oxygen and fuel gas is conducted by the forward portion of passage 3 into the tube 10 which delivers it to the passage 8 in the head. Thence it flows into distributing chamber 21—22 and through the inclined passages 23 in the tip into the passages 18 which deliver the mixture to the heating flame jets. In this position of the valve 28 the portion of the block passage 5 beyond the valve 28, the tube 11, the passage 9 in the head, and the distributing chamber 19—20 with which this passage communicates, are all idle and out of operation and the mixing of the fuel gas and the oxygen for the heating flames is effected in the block 2. The torch then operates on the body-mixing or premixing principle and is especially adapted for use with fuel gas such as propane.

When the valve 28 is turned to the position shown in Fig. 2, the by-pass 27 is closed and the nozzle 31 then becomes idle. The oxygen for the heating flames entering through the nipple 6 is then delivered by the valve 28 into the passage 5 in the block and thence to the tube 11, passage 9 in the head, distributing chamber 19—20, to the tip passages 18. The fuel gas entering through the nipple 4 and the passage 3 in the block will then be delivered by the tube 10, passage 8 in the head, and distributing chamber 21—22, to the inclined passages 23 in the tip which will deliver it to the tip passages 18 in which it mixes with the oxygen entering the rear end of these passages. Thus when the valve 28 is in the position shown in Fig. 2 the torch operates on the tip-mixing principle since the fuel gas, and the oxygen for the heating flames are delivered separately to the tip where they are mixed by reason of the converging and meeting tip passages 18 and 23. In this position of the valve 28 the torch is especially adapted for use with fuel gas such as acetylene.

It will be noted that the cutting oxygen entering through the nipple 7 is not affected by the operation of the valve 28. In all cases it is delivered to the passage 12 in the head and then through the central tip passage 17.

Fig. 4 shows a torch with no provision for supplying cutting oxygen to the tip. This torch is therefore of the heating or welding type. In this type of torch the tip has a central passage 33 for delivering a mixture of oxygen and fuel gas to the heating flame jet. When the torch is operating on the tip-mixing principle the passage 9' in the head 1, which corresponds to the passage 9 in Fig. 1, delivers oxygen to the rear end of the tip passage 33, and the passage 8' in the head delivers fuel gas to the distributing chamber 21'—22' which in turn delivers it to the inclined passages 23' at the rear end of the tip. The inclined passages 23' mix the fuel gas with the oxygen entering the rear end of the passage 33 and the mixture of oxygen and fuel gas is delivered by the passage 33 to the flame jet.

The block 2' at the rear end of the torch is similar to that shown in Fig. 1 except that it has no provision for the admittance and control of cutting oxygen. The valve 28 operates as above described either to open the by-pass 27 and close off the passage 5 to effect premixing or body mixing in the chamber 32, or to close the by-pass and open the passage 5 so that the fuel gas and oxygen are delivered separately to the tip. In the former case the mixture of oxygen and fuel gas enters the tip through the inclined passages 23' and is delivered by the passage 33 to the flame jet. The portion of the passage 5 beyond the valve 28, the tube 11, and the passage 9', are then idle. In the latter case by-pass 27 and the nozzle 31 are idle and the fuel gas and oxygen pass separately through the body of the torch and are mixed at the tip as above described.

Figs. 5, 6 and 7 show a tip portion which may be substituted for the torch tip of Fig. 4 to produce a modified form of torch. In this case the torch does not have a removable tip but the end of the head 1' constitutes the tip. The head is drilled to form a pair of parallel passages 34 and 35 and a pair of converging tip passages 36—37 which communicate with the passages 34 and 35 respectively. While the tip passages 36 and 37 converge, as do the passages 23 and 18 in Fig. 1, and the corresponding passages in Fig. 4, to produce mixing at the tip when the torch is operating on the tip-mixing principle, their axes do not intersect inside of the tip but at a point a short distance outside of the tip and therefore mixing of the gases takes place externally of the tip. The passages 34 and 35 are interconnected by a by-pass 38 controlled by a valve 39 which is preferably turned by applying a wrench or other suitable tool to a squared end 40 (Fig. 7) at one of the outer ends of the valve shaft. When the valve 39 is turned to the position shown in Fig. 6 to close the by-pass 38, and when the valve 28 at the rear end of the torch is in tip-mixing position, i. e., so that the fuel gas and oxygen are delivered separately toward the tip end of the torch, the fuel gas will be delivered by means of the passage 34 to the tip passage 36 and the oxygen will be delivered by the passage 35 separately to the tip passage 37. The converging passages will effect mixing of the two gas streams but the mixing will occur externally of the tip as above stated. Nevertheless this is a form of tip-mixing as distinguished from body-mixing or premixing. If the valve 39 is turned to the position shown in Fig. 5, in which the by-pass 38 is open, and the valve 28 at the rear end of the torch is turned to body mixing position, then the stream of mixed oxygen and fuel gas entering the passage 34 will divide and part of it will go through the by-pass 38. Under these circumstances each of the diverging tip passages 36 and 37 will deliver a mixture of oxygen and fuel gas to produce impinging flame jets. When the torch is operating in this fashion the portion of the passage 35 to the rear of the by-pass 38, as well as the tube 11, and the portion of the block passage 5 forward of the valve 28, are idle.

While the combustion supporting gas is referred to throughout the specification and the accompanying claims as oxygen, it will be understood that any other gas which will produce a combustible mixture with the fuel gas may be utilized.

I claim:

1. A torch comprising a body provided with a tip having converging gas passages therein adapted to effect external mixing of the gases passing through them when they conduct different gases and to produce impinging flame jets when each of such passages conducts a mixture of oxygen and fuel gas, oxygen and fuel gas passages in the body adapted to conduct oxygen and fuel gas separately to said converging passages in the tip for external mixing thereby, a by-pass in the body of the torch adapted to place said body passages in communication, manually operable valve means adapted in one position to close the by-pass and permit flow of oxygen and fuel gas separately through passages in the body to the converging passages in the tip for external mixing thereby and in another position to close one of the body passages and direct the gas which would otherwise flow therethrough through the by-pass into the second body passage whereby mixing of the gases may be effected in the torch body and the mixture of gases conducted by means of said second body passage toward the tip end of the torch, a second by-pass near the tip, and a manually operable valve controlling said second by-pass whereby when such by-pass is open and a mixture of gases is flowing through said second body passage the stream of mixed gases will divide and a portion of it will flow to each of the converging passages in the tip to produce impinging flame jets.

2. A torch comprising a body having a block at its rear end and a tip at its forward end, converging gas passages in the tip whose axes intersect outside of the tip and are adapted to effect external mixing of the gases passing through them when they conduct different gases and to produce impinging flame jets when each of such passages conducts a mixture of oxygen and fuel gas, separate oxygen and fuel gas inlet passages in said block and corresponding passages extending through the body to the passages in the tip, a by-pass in said block adapted to place in communication said passages therein, manually operable valve means associated with said block adapted in one position to close the by-pass and permit flow of oxygen and fuel gas separately through the passages in the body to the converging passages in the tip for external mixing thereby and in another position to close one of the passages in the block and direct the gas which would otherwise flow therethrough through the by-pass into the second passage in the block whereby a mixture of the gases may be conducted by means of said second passage in the block and the corresponding passage in the body toward the tip end of the torch, a second by-pass near the tip, and a manually operable valve controlling said second by-pass whereby when such by-pass is open and a mixture of the gases is flowing through one of the body passages the stream of mixed gases will divide and a portion of it will flow to each of the converging passages in the tip to produce impinging flame jets.

HOWARD G. HUGHEY.

REFERENCES CITED

The following references are of record in the file of this patent:

UNITED STATES PATENTS

| Number | Name | Date |
|---|---|---|
| 2,210,402 | Gaines | Aug. 6, 1940 |
| 2,210,403 | Skinner | Aug. 6, 1940 |

FOREIGN PATENTS

| Number | Country | Date |
|---|---|---|
| 494,218 | Great Britain | Oct. 21, 1938 |
| 402,400 | Germany | Sept. 15, 1924 |